(12) United States Patent
Ueda

(10) Patent No.: US 11,806,918 B2
(45) Date of Patent: Nov. 7, 2023

(54) METHOD FOR MANUFACTURING HIGH-PRESSURE TANK

(71) Applicant: TOYOTA JIDOSHA KABUSHIKI KAISHA, Toyota (JP)

(72) Inventor: Naoki Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/570,876

(22) Filed: Jan. 7, 2022

(65) Prior Publication Data
US 2022/0274313 A1    Sep. 1, 2022

(30) Foreign Application Priority Data

Mar. 1, 2021 (JP) ................................. 2021-031690

(51) Int. Cl.
| | |
|---|---|
| B29C 70/16 | (2006.01) |
| B29C 53/60 | (2006.01) |
| B29L 31/00 | (2006.01) |
| B29K 105/08 | (2006.01) |
| B29K 105/00 | (2006.01) |
| B29K 101/10 | (2006.01) |

(52) U.S. Cl.
CPC ............ *B29C 53/602* (2013.01); *B29C 70/16* (2013.01); *B29K 2101/10* (2013.01); *B29K 2105/0872* (2013.01); *B29K 2105/251* (2013.01); *B29L 2031/7156* (2013.01)

(58) Field of Classification Search
CPC .................................................. B29C 70/602
See application file for complete search history.

(56) References Cited

U.S. PATENT DOCUMENTS

| | | | | |
|---|---|---|---|---|
| 11,402,065 | B2* | 8/2022 | Sonnen | ................ B29C 53/602 |
| 11,472,135 | B2* | 10/2022 | Maeda | ................... B29C 70/30 |
| 2020/0309320 | A1 | 10/2020 | Ueda | |
| 2021/0197499 | A1* | 7/2021 | Katano | ..................... F17C 1/02 |
| 2021/0316494 | A1 | 10/2021 | Zgela et al. | |
| 2022/0235904 | A1 | 7/2022 | Ueda | |

FOREIGN PATENT DOCUMENTS

| | | |
|---|---|---|
| CN | 111795295 A | 10/2020 |
| DE | 112012002720 T5 | 4/2014 |
| DE | 102018121012 A1 | 3/2020 |

(Continued)

*Primary Examiner* — Jeffry H Aftergut
(74) *Attorney, Agent, or Firm* — HUNTON ANDREWS KURTH LLP

(57) ABSTRACT

A cylindrical winding body is formed by winding continuous fibers impregnated with a first thermosetting resin in a circumferential direction, and the first thermosetting resin in the winding body is thermally cured. A pair of dome members is joined to both end portions of the cylinder member. A fiber bundle impregnated with a second thermosetting resin is helically wound around the joined member over the dome members, and the second thermosetting resin in the wound fiber bundle is thermally cured. A thermosetting resin containing a main agent and a granular solid curing agent is used as the first thermosetting resin, the main agent including a resin precursor and the solid curing agent chemically bonding molecules of the resin precursor together.

4 Claims, 12 Drawing Sheets

(56) References Cited

FOREIGN PATENT DOCUMENTS

| DE | 102021131050 A1 | | 7/2022 |
|---|---|---|---|
| JP | H0866921 A | | 3/1996 |
| JP | 0798312 A1 | | 10/1997 |
| JP | 2010-059225 A | * | 3/2010 |
| JP | 2012149739 A | | 8/2012 |
| JP | 2018-158963 A | * | 10/2018 |
| JP | 2019218483 A | | 12/2019 |
| JP | 2021102994 A | | 7/2021 |
| WO | 2013001348 A2 | | 1/2013 |

* cited by examiner

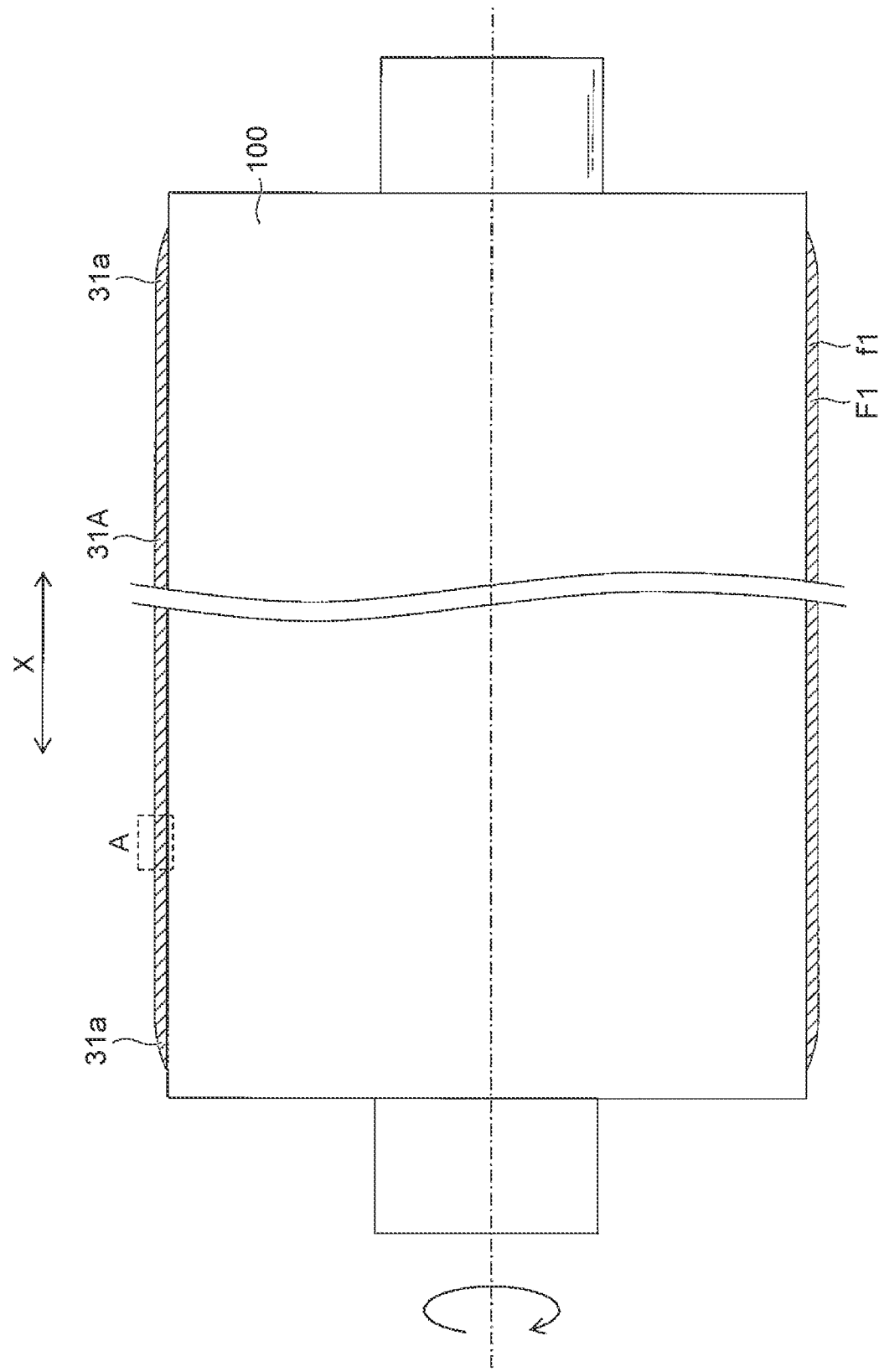

• EPOXY RESIN/AROMATIC RING
— TEMPERATURE

METHOD FOR MANUFACTURING HIGH-PRESSURE TANK

CROSS-REFERENCE TO RELATED APPLICATION

This application claims priority to Japanese Patent Application No. 2021-031690 filed on Mar. 1, 2021, incorporated herein by reference in its entirety.

BACKGROUND

1. Technical Field

The disclosure relates to methods for manufacturing a high-pressure tank.

2. Description of Related Art

For example, a high-pressure tank storing fuel gas is used in natural gas vehicles, fuel cell vehicles, etc. This type of high-pressure tank has a first reinforcing layer made of a fiber reinforced resin and a second reinforcing layer made of a fiber reinforced resin and covering the first reinforcing layer.

For example, Japanese Unexamined Patent Application Publication No. 2012-149739 (JP 2012-149739 A) proposes the following method as a method for manufacturing a high-pressure tank. First, an inner layer is formed on the outer surface of a liner by winding a fiber bundle impregnated with a thermosetting resin around the liner, and an outer layer is formed on the outer surface of the inner layer by helically winding a fiber bundle impregnated with a thermosetting resin. Next, the thermosetting resin in the inner and outer layers is thermally cured to form a first reinforcing layer and a second reinforcing layer covering the first reinforcing layer.

SUMMARY

In the method described in JP 2012-149739 A, the second reinforcing layer may be formed after forming the first reinforcing layer. Specifically, the first reinforcing layer may first be formed by thermally curing the thermosetting resin in the inner layer, and the second reinforcing layer may then be formed by forming the outer layer on the outer peripheral surface of the first reinforcing layer and thermally curing the thermosetting resin in the outer layer.

In this case, when thermally curing the thermosetting resin, the viscosity of the thermosetting resin decreases before the thermosetting resin is cured. Accordingly, for example, when thermally curing such an inner layer as described in JP 2012-149739 A, the viscosity of the thermosetting resin in the inner layer decreases before the thermosetting resin is cured, and the thermosetting resin with the reduced viscosity oozes from the surface of the inner layer. The oozing thermosetting resin may form a surface layer covering the surface of the inner layer. As a result, the surface layer made of the cured thermosetting resin may be formed on the surface of the thermally cured first reinforcing layer.

However, such a surface layer may reduce the adhesive force between the first reinforcing layer and the second reinforcing layer. In particular, the bonding area between the first reinforcing layer and the second reinforcing layer is larger in a cylinder portion (body portion) of the high-pressure tank than in dome portions of the high-pressure tank. It is therefore desirable that the adhesive force between the first reinforcing layer and the second reinforcing layer be high enough in the cylinder portion of the high-pressure tank.

The present disclosure was made in view of the above circumstances and provides a method for manufacturing a high-pressure tank with improved adhesion between a first reinforcing layer and a second reinforcing layer.

In view of the above problem, one aspect of the present disclosure provides a method for manufacturing a high-pressure tank. The method for manufacturing a high-pressure tank is a method for manufacturing a high-pressure tank including a first reinforcing layer made of a fiber reinforced resin and a second reinforcing layer made of a fiber reinforced resin and covering the first reinforcing layer. The method includes: preparing a cylinder member by forming a cylindrical winding body by winding a continuous fiber impregnated with a first thermosetting resin in a circumferential direction, and thermally curing the first thermosetting resin in the winding body; preparing a joined member corresponding to the first reinforcing layer by joining a pair of dome members to both end portions of the cylinder member; and forming the second reinforcing layer by helically winding a fiber bundle impregnated with a second thermosetting resin around the joined member over the dome members and thermally curing the second thermosetting resin in the wound fiber bundle. A thermosetting resin containing a main agent and a granular solid curing agent is used as the first thermosetting resin. The main agent includes a resin precursor of the first thermosetting resin and the solid curing agent chemically bonds molecules of the resin precursor together.

According to the present disclosure, when preparing the cylinder member, the cylindrical winding body is formed by winding in the circumferential direction the continuous fiber impregnated with the first thermosetting resin containing the main agent and the solid curing agent. When thermally curing the first thermosetting resin in the winding body, viscosity of the main agent decreases due to the heat before chemical bonding between molecules of the resin precursor that are included in the main agent proceeds. The main agent therefore oozes from between the continuous fibers onto a surface of the winding body.

Since the solid curing agent is a granular curing agent, the solid curing agent is more likely to be blocked by the continuous fiber than the main agent with the reduced viscosity is. As a result, the solid curing agent remains inside the winding body and is less likely to reach the surface of the winding body. A surface layer having a lower ratio of the solid curing agent to the main agent than the remaining part of the winding body is therefore formed on the surface of the winding body. Therefore, even when the winding body is heated for thermal curing, the surface layer is less likely to be cured and can be kept soft as compared to the remaining part of the winding body (resin inside the winding body). As a result, when helically winding the fiber bundle during formation of the second reinforcing layer, the surface layer is pushed aside by the fiber bundle, and the main agent (unreacted resin precursor) in the surface layer acts as an adhesive between the second reinforcing layer and the cylinder member. The adhesive force of the second reinforcing layer to the cylinder member can thus be increased in the produced high-pressure tank.

In the above method for manufacturing a high-pressure tank, a particle size of the solid curing agent may be larger than a gap between the continuous fibers. According to this aspect, since the solid curing agent is less likely to pass between the continuous fibers, the solid curing agent is therefore more likely to be retained inside the cylindrical winding body. As a result, since the surface layer having a lower ratio of the solid curing agent to the main agent than the remaining part of the winding body can be formed, the adhesive force of the second reinforcing layer to the cylinder member can be increased.

In the above method for manufacturing a high-pressure tank, the surface layer having a lower ratio of the solid curing agent to the main agent than a portion other than the surface of the winding body may be formed by causing the main agent to ooze from between the continuous fibers onto the surface of the winding body by heating the first thermosetting resin.

In the above method for manufacturing a high-pressure tank, the second thermosetting resin may contain a main agent and a granular solid curing agent. The main agent includes a resin precursor of the second thermosetting resin and the solid curing agent chemically bonds molecules of the resin precursor of the second thermosetting resin together.

In the above method for manufacturing a high-pressure tank, the main agent in the surface layer may react by the solid curing agent in the second thermosetting resin.

In the above method for manufacturing a high-pressure tank, the solid curing agent in the second thermosetting resin chemically may bond the resin precursor of the second thermosetting resin and the resin precursor of the first thermosetting resin together.

According to the present disclosure, the adhesive force between the first reinforcing layer and the second reinforcing layer of the high pressure tank can be increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a sectional view illustrating a cylinder member preparing step shown in FIG. 2;

DETAILED DESCRIPTION OF EMBODIMENTS

Hereinafter, an embodiment according to the present disclosure will be described with reference to FIGS. 1 to 11, 15A, and 15B. First, a high-pressure tank 1 according to the present embodiment will be described. Although the high-pressure tank 1 is herein described as a tank that is charged with high-pressure hydrogen gas and is mounted on a fuel cell vehicle, the high-pressure tank 1 can also be applied to other uses. The gas that can be stored in the high-pressure tank 1 is not limited to high-pressure hydrogen gas. Examples of the gas that can be stored in the high-pressure tank 1 include various compressed gases such as compressed natural gas (CNG), various liquefied gases such as liquefied natural gas (LNG) and liquefied petroleum gas (LPG), and other gases.

1. High-Pressure Tank 1

Figure 1:
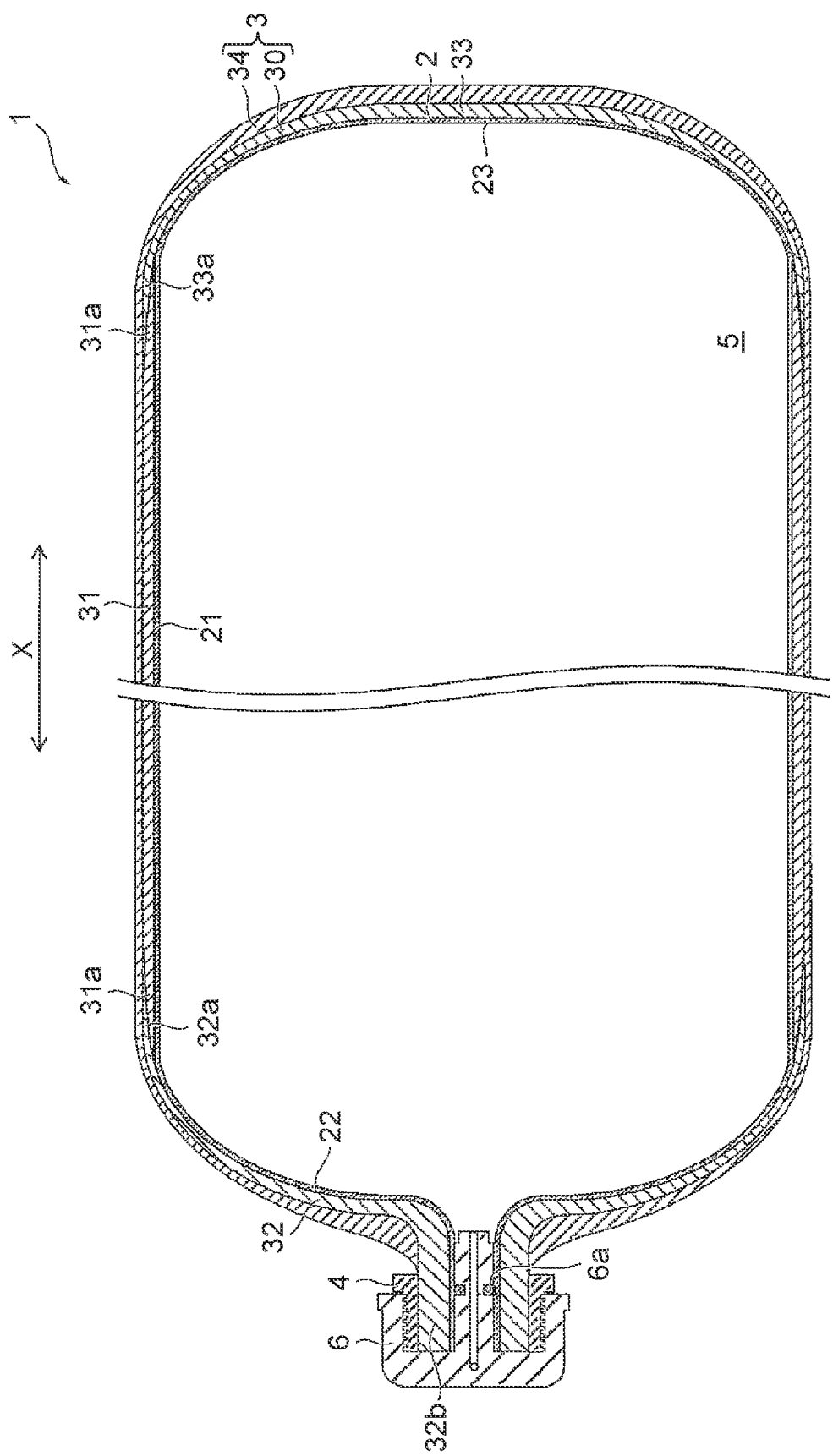
FIG. 1 is a sectional view showing a structure of a high-pressure tank according to an embodiment of the present disclosure.

As shown in FIG. 1, the high-pressure tank 1 is a generally cylindrical high-pressure gas storage container with dome-shaped rounded ends. The high-pressure tank 1 includes a liner 2 having gas barrier properties and a reinforcing portion 3 made of a fiber reinforced resin and covering the outer surface of the liner 2. The high-pressure tank 1 has an opening in its one end and has a boss 4 attached around the opening.

The liner 2 forms a storage space 5 that stores high-pressure hydrogen gas. The liner 2 is a resin layer formed on the inner surface of a first reinforcing layer 30, and includes a cylindrical body portion 21 and dome-shaped side end portions 22, 23 formed on both sides of the body portion 21. In the present embodiment, the body portion 21 extends with a predetermined length in the axial direction X of the high-pressure tank 1 and has a cylindrical shape. The side end portions 22, 23 are continuous with both sides of the body portion 21 and have a dome shape. The diameter of each side end portion 22, 23 decreases as it gets farther from the body portion 21. A tubular portion is provided in the smallest diameter portion of one of the side end portions 22, 23, namely the side end portion 22. The tubular portion has a through hole.

The resin for the liner 2 is preferably a resin capable of satisfactorily retaining stored gas in the storage space 5, that is, a resin with satisfactory barrier properties. Examples of such a resin include a thermoplastic resin and a thermosetting resin mentioned below as examples of a resin material M.

The boss 4 is formed by processing a metal material such as aluminum or aluminum alloy into a predetermined shape. A valve 6 that controls the flow of hydrogen gas into and out of the storage space 5 is attached to the boss 4. The valve 6 is provided with a seal member 6a. The seal member 6a is in contact with the inner surface of the liner 2 in a protruding portion 32b of a dome member 32 and seals the storage space 5 of the high-pressure tank 1.

The reinforcing portion 3 functions to reinforce the liner 2 and improve mechanical strength, such as rigidity and pressure resistance, of the high-pressure tank 1 and is made of a fiber reinforced resin composed of reinforcing fibers (continuous fibers) and a matrix resin. The reinforcing portion 3 includes the first reinforcing layer 30 and a second reinforcing layer 34. The first reinforcing layer 30 is made of a fiber reinforced resin and covers the outer surface of the liner 2. The second reinforcing layer 34 is made of a fiber reinforced resin and covers the outer surface of the first reinforcing layer 30. The first reinforcing layer 30 is formed as a single piece by a cylinder member 31 and a pair of dome members 32, 33 joined to both sides of the cylinder member 31.

The first reinforcing layer 30 is a laminate of a plurality of layers of a fiber reinforced resin composed of continuous fibers and a thermosetting resin as a matrix resin. The continuous fibers in the cylinder member 31 are oriented along the circumference of the cylinder member 31 at an angle substantially perpendicular to the axial direction X of the cylinder member 31. In other words, the continuous fibers in the cylinder member 31 are oriented in the circumferential direction of the cylinder member 31. The continuous fibers in the dome members 32, 33 are not oriented in the circumferential direction of the cylinder member 31 but extend from near the tops of the dome members 32, 33 toward peripheral end portions 32a, 33a of the dome members 32, 33 in various directions crossing the circumferential direction.

In the present embodiment, the continuous fibers in the cylinder member 31 and the continuous fibers in the dome members 32, 33 are not continuous (not connected). As will be described later, this is because the two dome members 32, 33 are attached to both ends of the cylinder member 31 after the cylinder member 31 and the dome members 32, 33 are separately formed.

The second reinforcing layer 34 is a laminate of a plurality of layers of a fiber reinforced resin composed of continuous fibers and a thermosetting resin as a matrix resin. The second reinforcing layer 34 covers the outer surface of the first reinforcing layer 30. That is, the second reinforcing layer 34 is a layer that covers the outer surface of the cylinder member 31 and the outer surfaces of the dome members 32, 33. The continuous fibers in the second reinforcing layer 34 are oriented so as to be parallel to, or tilted by a predetermined angle or less with respect to, the axial direction X of the cylinder member 31 and are oriented over the cylinder member 31 and the dome members 32, 33 on both sides of the cylinder member 31. The dome members 32, 33 can be restrained to the cylinder member 31 by the continuous fibers.

Figure 10:
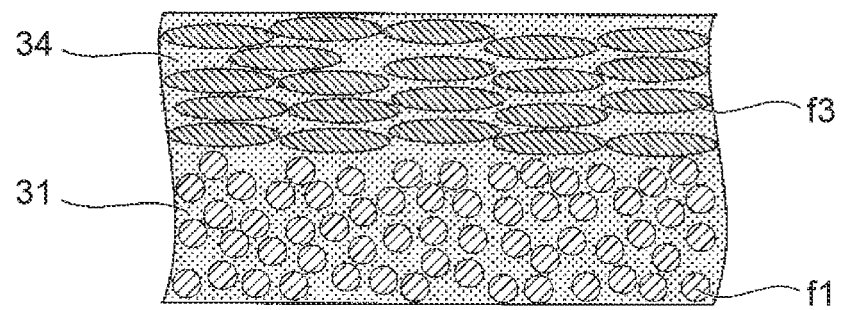
FIG. 10 is a schematic conceptual diagram illustrating the state of a portion B shown in FIG. 9 after thermal curing.

As will be described later, in the high-pressure tank 1 of the present embodiment, the cylinder member 31 and the second reinforcing layer 34 closely adhere to each other (see FIG. 10). The adhesive force between the first and second reinforcing layers 30, 34 is thus improved.

2. Manufacturing Method of High-Pressure Tank 1

Figure 2:
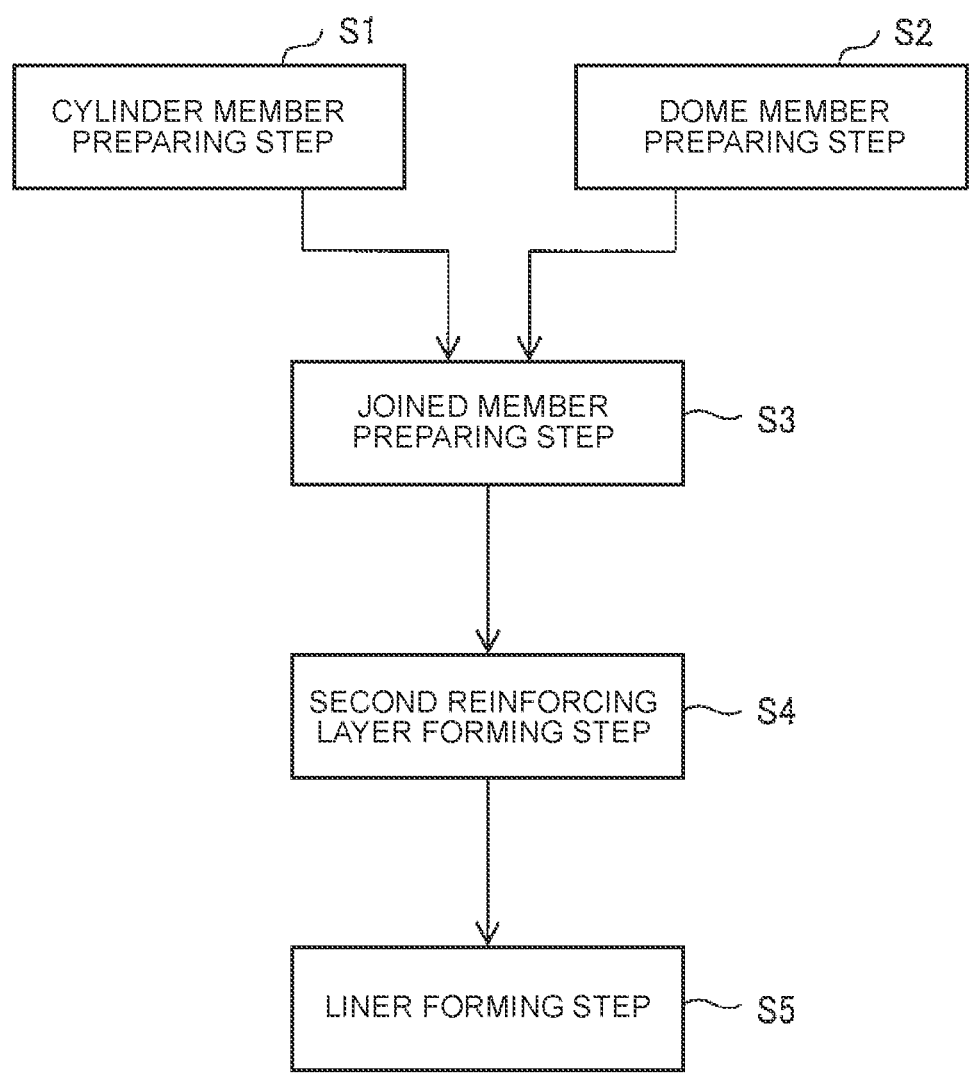
FIG. 2 is a flowchart illustrating steps of a method for manufacturing the high-pressure tank shown in FIG. 1.

Next, a method for manufacturing the high-pressure tank 1 according to the embodiment of the disclosure will be described. FIG. 2 is a flowchart illustrating steps of the method for manufacturing the high-pressure tank 1. As shown in FIG. 2, the method for manufacturing the high-pressure tank 1 includes a cylinder member preparing step S1, a dome member preparing step S2, a joined member preparing step S3, a second reinforcing layer forming step S4, and a liner forming step S5.

The cylinder member preparing step S1, the joined member preparing step S3, and the second reinforcing layer forming step S4 correspond to "preparing a cylinder member," "preparing a joined member," and "forming the second reinforcing layer" in the present disclosure, respectively. Since the cylinder member preparing step S1 and the dome member preparing step S2 are performed independently of each other, these steps S1, S2 may be performed in parallel or one of these steps S1, S2 may be performed first. First, the cylinder member preparing step S1 will be described.

2-1. Cylinder Member Preparing Step S1

In the cylinder member preparing step S1 shown in FIG. 2, as shown in FIG. 3, a cylindrical winding body 31A is formed by winding continuous fibers f1 impregnated with a first thermosetting resin in the circumferential direction. The cylinder member 31 is prepared by thermally curing the first thermosetting resin in the winding body 31A. The cylinder member 31 thus prepared will become a part of the first reinforcing layer 30 in a later step.

As shown in FIG. 3, when forming the winding body 31A, a fiber bundle F1 is wound around, for example, a cylindrical mandrel 100 by, for example, filament winding (FW process). The fiber bundle F1 is a bundle of a plurality of continuous fibers f1 impregnated with the first thermosetting resin.

The outer diameter of the mandrel 100 is an outer diameter equal to the inner diameter of the cylinder member 31, and is preferably set to such a value that the dome members 32, 33 can be fitted on the cylinder member 31. The material of the mandrel 100 is not particularly limited, but is preferably a metal. Since the mandrel 100 made of a metal can be rapidly heated or cooled, a desired temperature profile can be implemented during thermal curing.

When winding the fiber bundle F1, the fiber bundle F1 is wound in layers around the mandrel 100 by hoop winding while rotating the mandrel 100 in the circumferential direction by a rotation mechanism (not shown). The winding is performed while applying predetermined winding tension to the fiber bundle F1, and is performed so that a plurality of layers of the wound fiber bundle F1 is formed.

The hoop winding is a winding method in which the fiber bundle F1 is wound in the circumferential direction of the mandrel 100 such that the winding angle between the central axis of the mandrel 100 and the winding direction of the fiber bundle F1 is substantially a right angle. As used herein, "substantially a right angle" includes both 90° and angles of around 90° that may be formed by winding the fiber bundle F1 while shifting the winding position of the fiber bundle F1 so that the adjacent fiber bundles F1 do not overlap each other. The cylindrical winding body 31A in which the continuous fibers are oriented in the circumferential direction is thus formed.

As shown in FIG. 3, each end portion 31a in the axial direction X of the winding body 31A becomes gradually thinner towards the end in the axial direction X of the winding body 31A. With this configuration, steps are less likely to be formed at the joints between the outer surface of the cylinder member 31 and the outer surfaces of the dome members 32, 33 when joining the dome members 32, 33 to both end portions 31a of the cylinder member 31.

In order to make both end portions 31a in the axial direction X of the winding body 31A gradually thinner towards the ends in the axial direction X of the winding body 31A, the winding width of the fiber bundle F1 may be gradually reduced. Alternatively, the end portions 31a in the axial direction X of the winding body 31A may be made gradually thinner toward the ends in the axial direction X of the winding body 31A by pressing the end portions 31a by a roller etc.

Figure 15A:
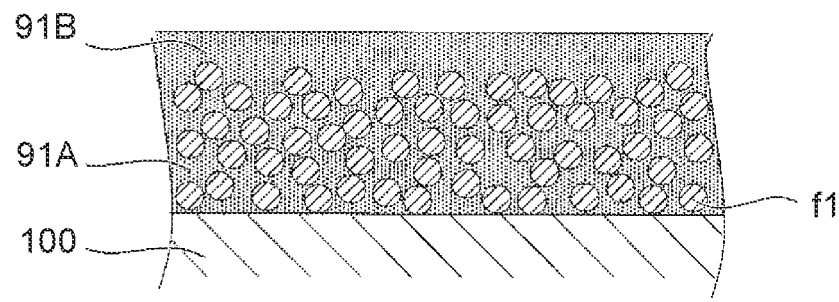
FIG. 15A is a schematic conceptual diagram illustrating the state of a portion corresponding to the portion A shown in FIG. 3 after thermal curing during preparation of a cylinder member in a method for manufacturing a high-pressure tank according to a comparative example.
Figure 15B:
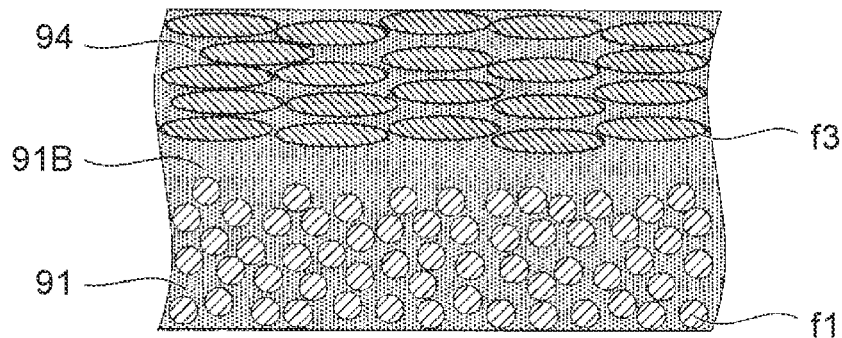
FIG. 15B is a schematic conceptual diagram illustrating the state of a portion corresponding to the portion B shown in FIG. 9 after thermal curing during formation of a second reinforcing layer in the method for manufacturing a high-pressure tank according to the comparative example.

A method for manufacturing a high-pressure tank according to a comparative example of the present embodiment will be described with reference to FIGS. 15A and 15B. The same members and portions as those in the present embodiment are denoted by the same signs, and detailed description thereof will be omitted. In the method for manufacturing a high-pressure tank according to the comparative example, when preparing a cylinder member, a cylindrical winding body 91A is formed by winding continuous fibers impregnated with a thermosetting resin around the mandrel 100.

When thermally curing the winding body 91A, the viscosity of the thermosetting resin in the winding body 91A starts to decrease. The thermosetting resin therefore oozes from the surface of the winding body 91A, and a surface layer 91B is formed on the winding body 91A. Since the surface layer 91B has about the same content of a resin precursor and a liquid curing agent as the remaining part of the winding body 91A, the surface layer 91B is also thermally cured like the thermosetting resin in the remaining part is.

Even if a second reinforcing layer 94 is formed on the thermally cured surface layer 91B, the cured surface layer 91B that is present between a cylinder member 91 and the second reinforcing layer 94 may reduce the adhesive force between the cylinder member 91 and the second reinforcing layer 94.

Figure 4A:
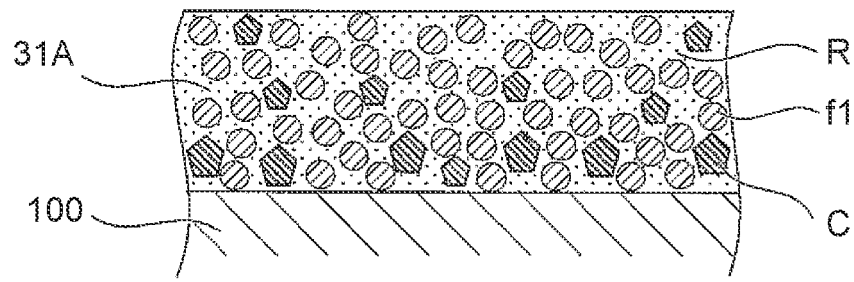
FIG. 4A is a schematic conceptual diagram illustrating the state of a portion A shown in FIG. 3 before thermal curing.
Figure 4B:
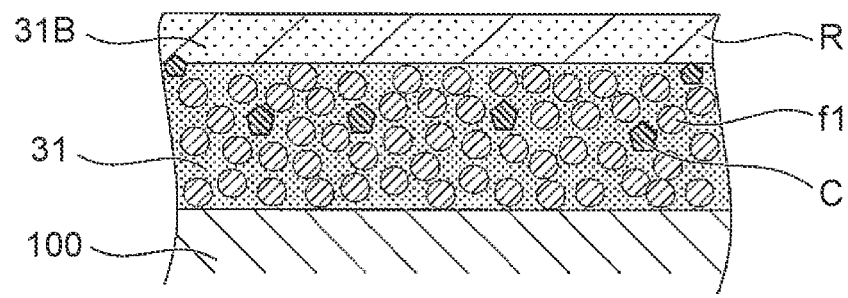
FIG. 4B is a schematic conceptual diagram illustrating the state of the portion A shown in FIG. 3 after thermal curing.

In the present embodiment, as shown in FIG. 4A, a thermosetting resin containing a main agent R and a granular solid curing agent C is therefore used as the first thermosetting resin. The main agent R includes a resin precursor and the solid curing agent C chemically bonds molecules of the resin precursor together.

The resin precursor may be either a monomer or a prepolymer, and a cross-linking reaction or polymerization reaction of the resin precursor is caused by the curing agent. Molecules of the resin precursor are directly chemically bonded together by the cross-linking reaction or polymerization reaction of the resin precursor, or molecules of the resin precursor are chemically bonded together via the curing agent (cross-linking agent). The thermosetting resin is cured by this chemical bonding.

As shown in FIG. 4A, before thermal curing, the winding body 31A includes the first thermosetting resin containing a main agent R and a solid curing agent C. In the initial stage of thermally curing the first thermosetting resin in the winding body 31A, the viscosity of the main agent R decreases due to the heat before the chemical bonding between molecules of the resin precursor that are included in the main agent R proceeds. The main agent R therefore oozes from between the continuous fibers f1 onto the surface of the winding body 31A.

Since the solid curing agent C is a granular curing agent, the solid curing agent C is more likely to be blocked by the continuous fibers f1 than the main agent R with the reduced viscosity is. As a result, the solid curing agent C remains inside the winding body 31A and is less likely to reach the surface of the winding body 31A. A surface layer 31B having a lower ratio of the solid curing agent C to the main agent R than the remaining part of the winding body 31A is therefore formed on the surface of the winding body 31A.

Thereafter, the temperature of the first thermosetting resin further increases. Accordingly, the solid curing agent C is dissolved, and the dissolved solid curing agent C and the resin precursor that is included in the main agent R chemically react with each other, so that the first thermosetting resin is cured. However, since the surface layer 31B formed on the surface of the winding body 31A has a low ratio of the solid curing agent C to the main agent R, the surface layer 31B is less likely to be cured even when the winding body 31A is heated for thermal curing. Accordingly, the surface layer 31B can be kept softer than the remaining part of the winding body 31A (resin inside the winding body 31A). Since the resin precursor that is included in the main agent R remains in the surface layer 31B after heating, the resin precursor reacts with a curing agent contained in a second thermosetting resin in the second reinforcing layer 34 that will be described later. The adhesive force of the second reinforcing layer 34 to the cylinder member 31 is thus increased.

Figure 5:
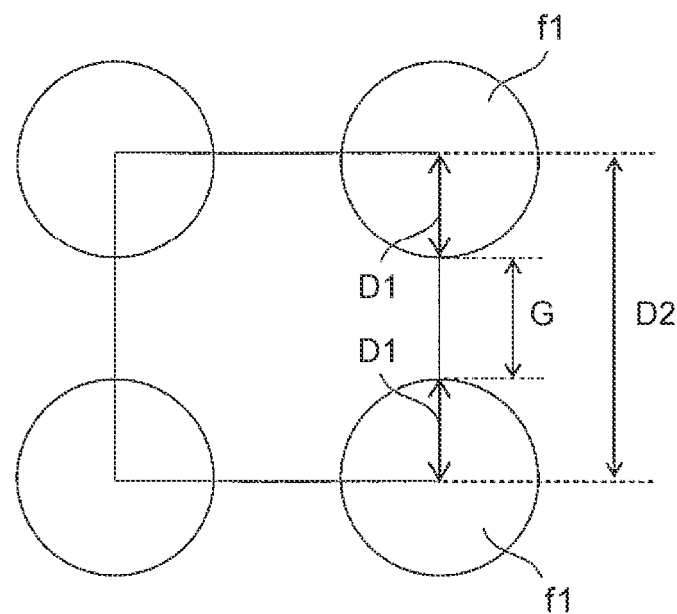
FIG. 5 is a schematic conceptual diagram illustrating an example of the gap between continuous fibers.

In the present embodiment, the particle size (median size) of the solid curing agent C is preferably larger than the gap G between the continuous fibers f1 shown in FIG. 5. This makes it more difficult for the solid curing agent C to pass between the continuous fibers f1. The solid curing agent C is therefore more likely to be retained inside the winding body 31A. The surface layer 31B having a lower ratio of the solid curing agent C to the main agent R than the remaining part of the winding body 91A can thus be formed.

As shown in FIG. 5, the size of the gap G between the continuous fibers f1 can be obtained by subtracting the radius D1 of the adjacent continuous fibers f1 from the distance D2 between the centers of the adjacent continuous fibers f1. The distance D2 between the centers of the adjacent continuous fibers f1 can be obtained from the fiber volume fraction Vf. The fiber volume fraction is the ratio of the volume of the fibers to the total volume of the resin and fibers.

The particle size of the solid curing agent C is preferably 20 μm or more, although it depends on the conditions of the radius D1 of the continuous fiber f1 and the fiber volume fraction Vf. The particle size of the solid curing agent C represents the median size (D50) as measured by a laser diffraction and scattering particle size distribution measurement method.

Reinforced fibers such as glass fibers, aramid fibers, boron fibers, or carbon fibers can be used as the continuous fibers f1. Carbon fibers are particularly preferable in terms of lightness, mechanical strength, etc.

Examples of the main agent R in the first thermosetting resin include resin precursors such as phenol resin precursor, melamine resin precursor, urea resin precursor, and epoxy resin precursor. The epoxy resin precursor is particularly preferable in terms of mechanical strength etc. The epoxy resin precursor is fluid in an uncured state, and becomes an epoxy resin that forms a strong crosslinked structure after thermal curing.

Assuming that the above relationship between the particle size of the solid curing agent C and the gap G between the continuous fibers f1 is satisfied, the solid curing agent C in the first thermosetting resin is not particularly limited as long as the solid curing agent C can chemically bond the main agent R (molecules of resin precursor) together.

Examples of the solid curing agent C when the main agent R is, for example, an epoxy resin precursor include amines, acid anhydrides, dicyandiamide (DICY), and organic acid hydrazides.

Examples of the amines include aromatic amines. Specific examples of the aromatic amines include meta-phenylenediamine, diaminodiphenylmethane, and diaminodiphenylsulfone. Examples of the acid anhydrides include an aromatic acid anhydride, a cyclic aliphatic acid anhydride, a halogen acid anhydride such as chlorendic acid anhydride, and an aliphatic acid anhydride. Examples of the aromatic acid anhydride include phthalic anhydride, trimellitic anhydride, pyromellitic anhydride, benzophenonetetracarboxylic anhydride, ethylene glycol bistrimellitate, and glycerol tristrimellitate. Examples of the cyclic aliphatic acid anhydride include maleic anhydride, tetrahydrophthalic anhydride, endomethylenetetrahydrophthalic anhydride, hexahydrophthalic anhydride, succinic anhydride, and methylcyclohexen dicarboxylic anhydride. Examples of the aliphatic acid anhydride include an alkylstyrene-maleic anhydride copolymer and a polyazelaic acid anhydride.

In the present embodiment, dicyandiamide is used as an example. Dicyanamide is high melting point crystal with a melting point of 207 to 210° C. When heated, dicyanamide is decomposed into cyanamide in a solution state and thus can react with an epoxy resin precursor.

In the present embodiment, a curing accelerator may be used with the solid curing agent C. The curing accelerator is not particularly limited as long as it increases the curing properties of the solid curing agent C. Specific examples of the curing accelerator include imidazole, tertiary amines, and aromatic amines. In the present embodiment, imidazole is used as an example. Imidazole can act as a catalyst that lowers the melting point of the solid curing agent C during thermal curing.

An example in which the cylinder member 31 is formed by the FW process is described above. However, the cylinder member 31 may be formed by winding a fiber sheet impregnated with the first thermosetting resin around the mandrel 100 by sheet winding. Alternatively, the cylinder member 31 may be formed by so-called centrifugal winding (CW), namely by attaching a fiber sheet to the inner surface of the rotating mandrel 100.

2-2. Dome Member Preparing Step S2

Figure 6:
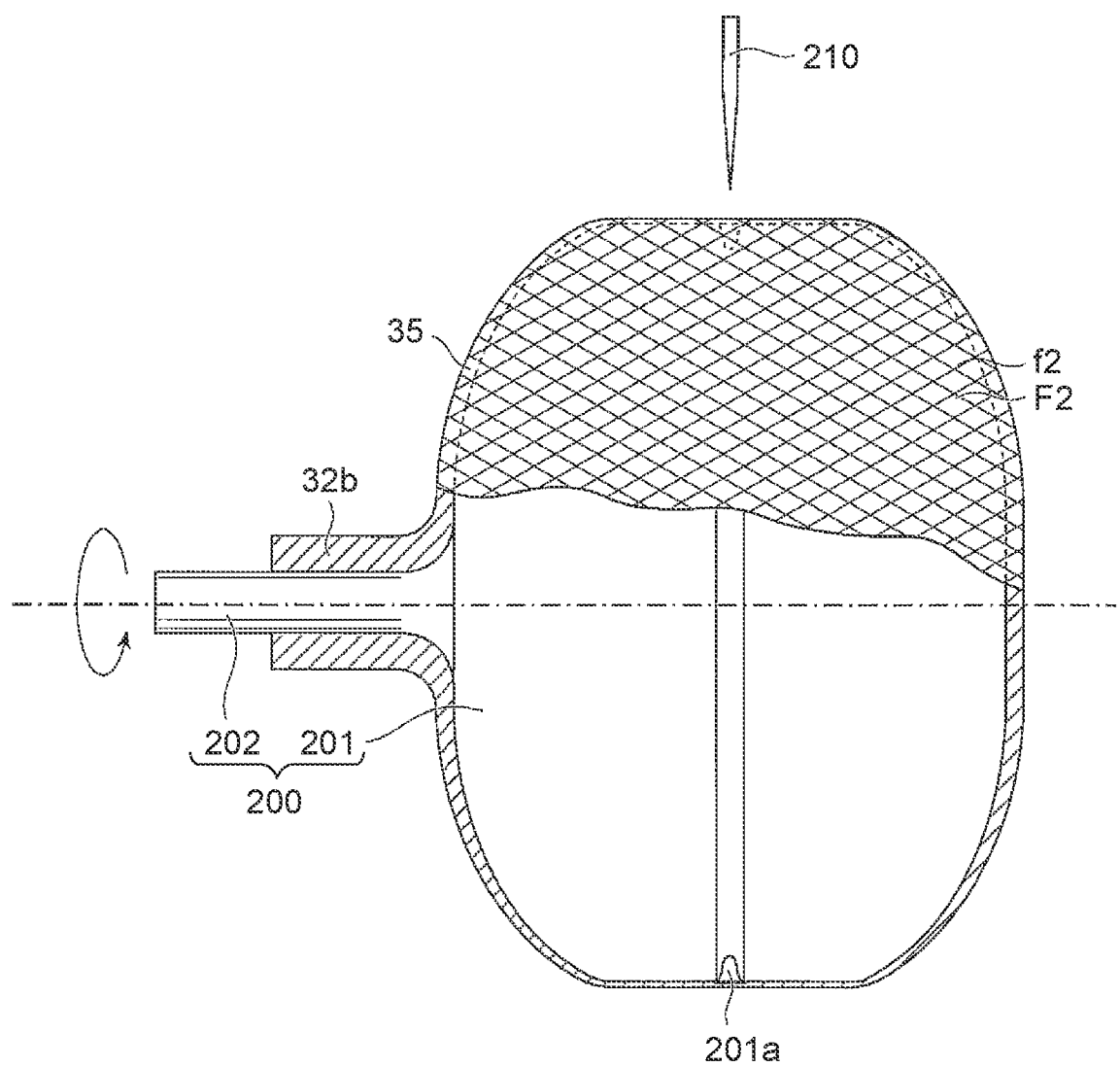
FIG. 6 is a sectional view illustrating a dome member preparing step shown in FIG. 2.

The dome members 32, 33 that will become the first reinforcing layer 30 are formed in the dome member preparing step S2 shown in FIG. 2. Specifically, as shown in FIG. 6, a fiber bundle F2 impregnated with a thermosetting resin is first wound around a mandrel 200 by, for example, filament winding (FW process).

The mandrel 200 includes a body portion 201 and a shaft portion 202 extending outward from one end of the body portion 201. The body portion 201 has a circular shape as viewed in the axial direction of the shaft portion 202. The body portion 201 has a groove 201a in the middle in the axial direction. The groove 201a is formed in the outer peripheral surface of the body portion 201 and extends along the entire circumference of the body portion 201. The outer surface of the mandrel 200 has a shape corresponding the dome-shaped side end portions 22, 23 of the liner 2 joined together without the body portion 21 therebetween. The mandrel 200 has the groove 201a at a position corresponding to the joint between the side end portions 22, 23. The shaft portion 202 is rotatably supported by a rotation mechanism (not shown).

Figure 7:
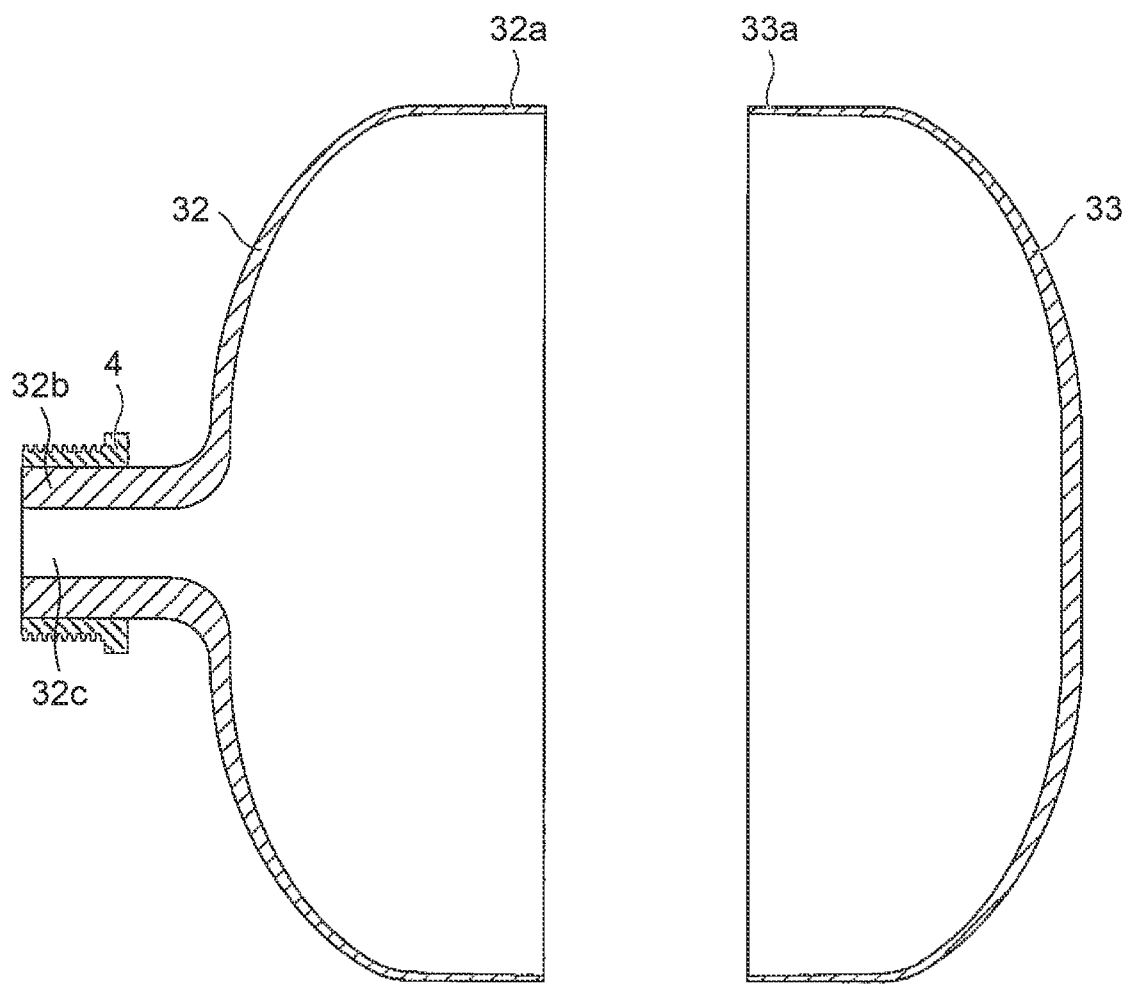
FIG. 7 is a sectional view of a pair of dome members prepared in the dome member preparing step shown in FIG. 2.

When winding the fiber bundle F2 around the mandrel 200, the mandrel 200 is rotated to wind the fiber bundle F2 such that the fiber bundle F2 covers the outer surface of the mandrel 200, thereby forming a spherical shell-like winding body 35 made of the fiber bundle F2. At this time, the fiber bundle F2 is also wound around the shaft portion 202 to form the cylindrical protruding portion 32b with a through hole 32c as shown in FIG. 7. The fiber bundle F2 is wound at an angle at, for example, 30 to 50 degrees with respect to the axial direction of the shaft portion 202.

The winding body 35 may be pressed by a roller etc. near the position corresponding to the joint between the side end portions 22, 23 so that the peripheral end portions 32a, 33a of the dome members 32, 33 become gradually thinner towards the open ends in the axial direction X of the dome members 32, 33.

In the state shown in FIG. 6, the boss 4 is attached to the outer surface of the protruding portion 32b, and the thermosetting resin in the winding body 35 made of the fiber bundle F2 is thermally cured. The winding body 35 made of the cured fiber bundle F2 is divided into two parts using a cutter 210 (see FIG. 6). When dividing the winding body 35 into two parts, a blade of the cutter 210 is inserted into the groove 201a of the mandrel 200 while rotating the mandrel 200. The fiber bundle F2 is thus cut by the cutter 210. The winding body 35 can be divided into two parts in this manner. As shown in FIG. 7, the two parts of the winding body 35 thus obtained are then removed from the mandrel 200. The dome members 32, 33 are formed in this manner.

The fiber bundle F2 may be a bundle of a plurality of continuous fibers f2 impregnated with a thermosetting resin. Examples of the continuous fibers f2 include fibers similar to the reinforced fibers mentioned above as examples of the continuous fibers f1. Carbon fibers are particularly preferable in terms of lightness, mechanical strength, etc. The thermosetting resin with which the fiber bundle F2 is impregnated may be similar to the first thermosetting resin. In this case, since a surface layer similar to the surface layer 31B of the cylinder member 31 is formed on the surfaces of the dome members 32, 33, adhesion between the dome members 32, 33 and the second reinforcing layer 34 can be increased. A main agent of this thermosetting resin may be an epoxy resin precursor, and a curing agent of this thermosetting resin may be a liquid curing agent. In this case, the liquid curing agent is preferably polyamine.

An example in which the dome members 32, 33 are formed by the FW process is described above. However, the present disclosure is not limited to this, and the dome members 32, 33 may be formed by tape placement. In this case, each dome member 32, 33 may be formed by pressing and attaching a fiber bundle to the surface of a dome-shaped die by a roller.

2-3. Joined Member Preparing Step S3

Figure 8:
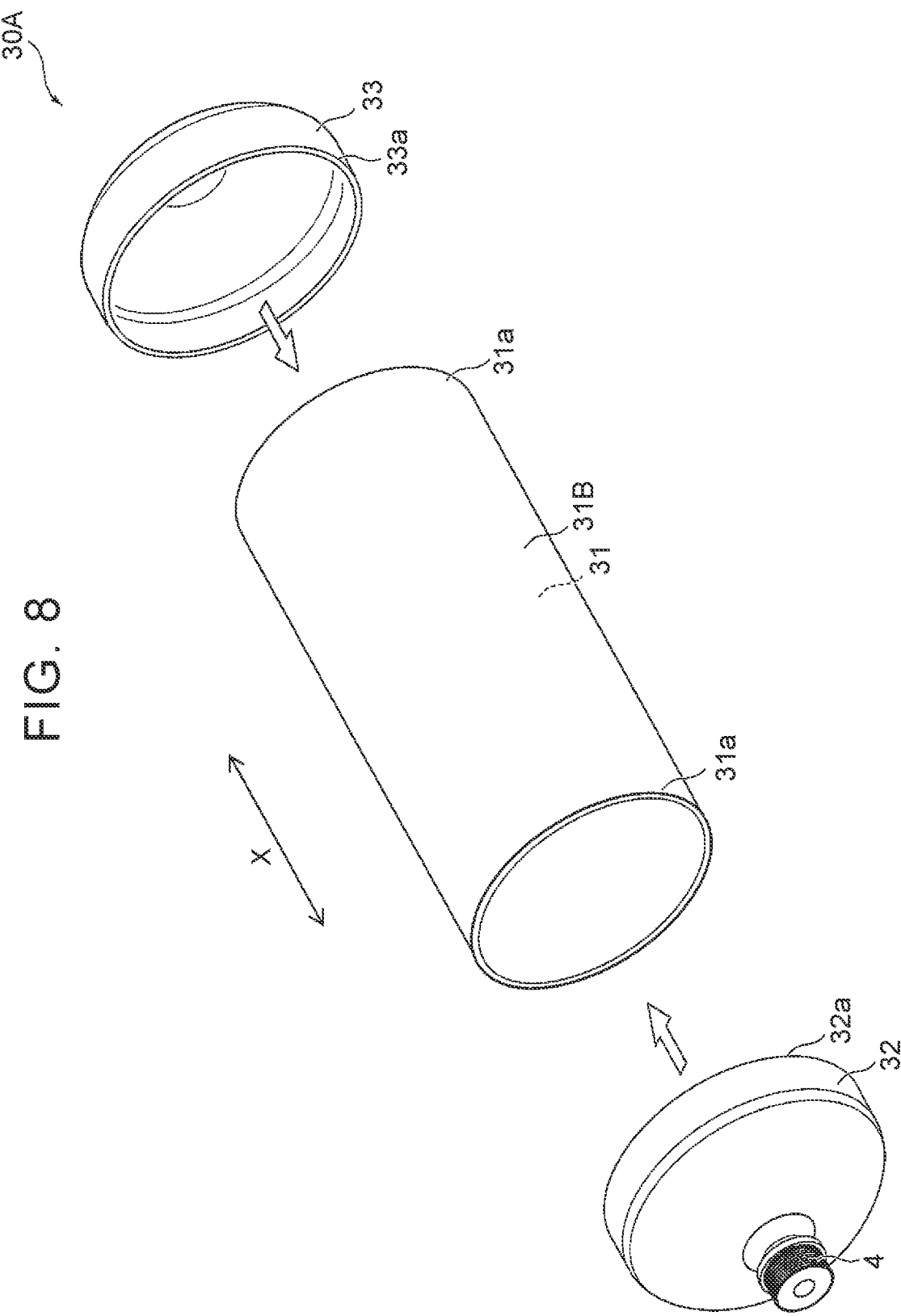
FIG. 8 is a schematic perspective view illustrating a joined member preparing step shown in FIG. 2.

Next, the joined member preparing step S3 is performed as shown in FIG. 2. In this step, as shown in FIG. 8, the dome members 32, 33 are joined to the end portions 31a of the cylinder member 31. Specifically, the peripheral end portions 32a, 33a of the dome members 32, 33 are joined to the end portions 31a of the cylinder member 31. A joined member 30A corresponding to the first reinforcing layer 30 is formed in this manner. In the present embodiment, the surface layer 31B is exposed on the outer surface of the cylinder member 31 of the joined member 30A.

Figure 9:
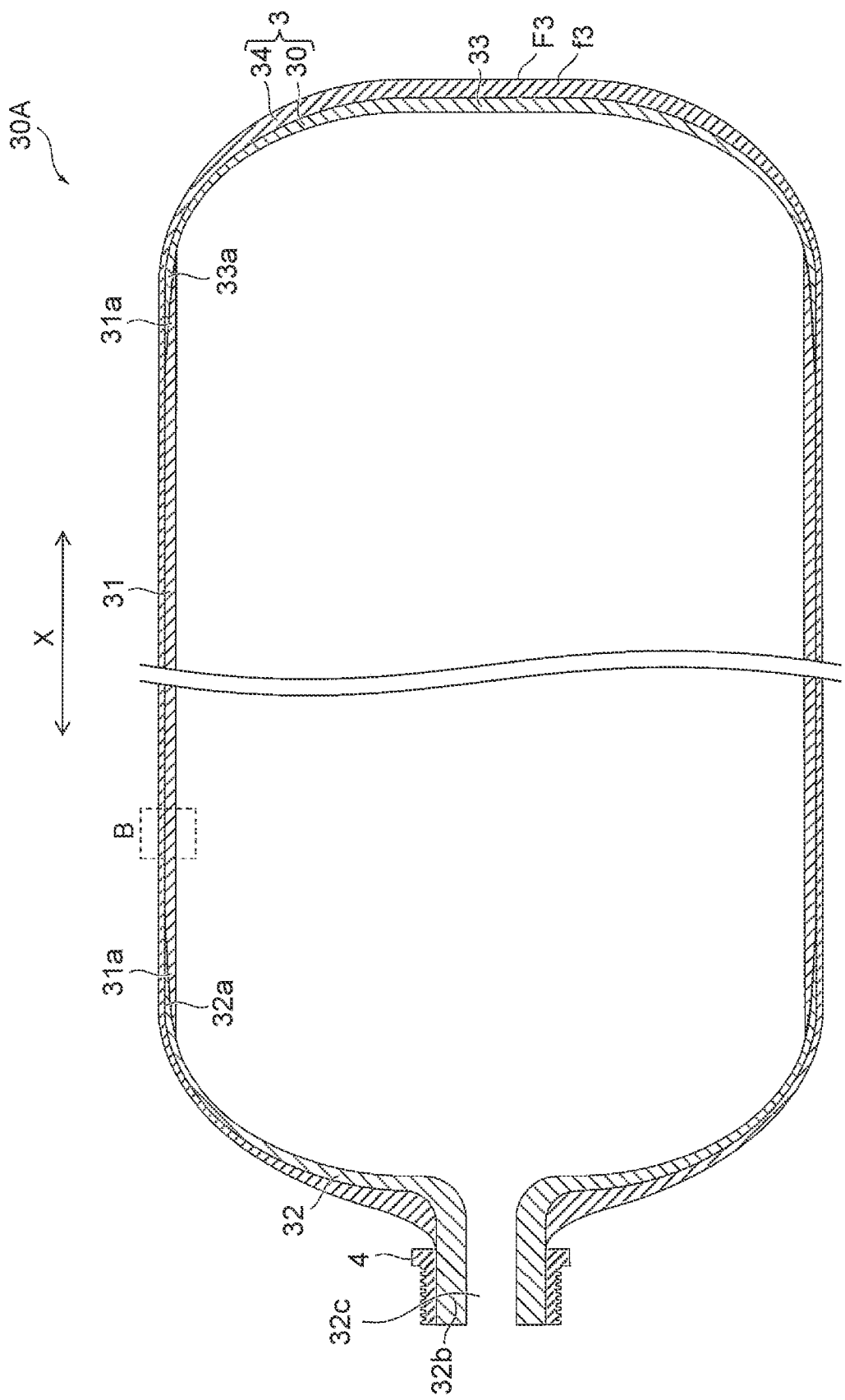
FIG. 9 is a sectional view of a joined member with a second reinforcing layer formed thereon in a second reinforcing layer forming step shown in FIG. 2.

When joining the dome members 32, 33 to the end portions 31a of the cylinder member 31, the dome members 32, 33 may be fitted on the cylinder member 31 (see FIG. 9). Since the soft surface layer 31B is formed on the surface of the cylinder member 31, the joint between the cylinder member 31 and the dome members 32, 33 can further be strengthened.

When fitting the dome members 32, 33, an adhesive (not shown) may be placed between the cylinder member 31 and the dome members 32, 33. The material of the adhesive is not particularly limited. However, for example, the adhesive is preferably a thermosetting resin such as epoxy resin. The adhesive may be a thermosetting resin containing the same components as the resin of the cylinder member 31 or the dome members 32, 33.

2-4. Second Reinforcing Layer Forming Step S4

Next, the second reinforcing layer forming step S4 is performed as shown in FIG. 2. In this step, as shown in FIGS. 8 and 9, a fiber bundle F3 impregnated with the second thermosetting resin is helically wound around the joined member 30A over the dome members 32, 33. Thereafter, the second thermosetting resin in the wound fiber bundle F3 is thermally cured to form the second reinforcing layer 34. By forming the second reinforcing layer 34, the reinforcing portion 3 including the first reinforcing layer 30 and the second reinforcing layer 34 can be formed.

The helical winding is a winding method in which the fiber bundle is wound obliquely (in the range of 10° or more and 60° or less) over the dome members 32, 33 with respect to the axial direction X of the cylinder member 31. The number of layers of the wound fiber bundle F3 is, for example, about 2 to 10. However, the number of layers of the wound fiber bundle F3 is not particularly limited as long as the second reinforcing layer 34 is strong enough.

In the present embodiment, since the surface layer 31B includes an unreacted resin precursor, the surface layer 31B is softer than the other thermosetting resins in the cylinder member 31. Therefore, when helically winding the fiber bundle F3 around the joined member 30A, the surface layer 31B is pushed aside by the fiber bundle F3. As a result, as shown in FIG. 10, the second reinforcing layer 34 can be closely attached to the outer surface of the cylinder member 31. Voids are therefore less likely to be formed between the second reinforcing layer 34 and the cylinder member 31.

After the fiber bundle F3 is wound around the joined member 30A, the second thermosetting resin with which the fiber bundle F3 is impregnated is thermally cured. In the present embodiment, when thermally curing the second thermosetting resin, the main agent R in the surface layer 31B is crosslinked or polymerized by the curing agent etc. contained in the second thermosetting resin. The surface layer 31B formed on the outer surface of the cylinder member 31 can thus function as an adhesive between the cylinder member 31 and the second reinforcing layer 34. As a result, the adhesive force between the first reinforcing layer 30 and the second reinforcing layer 34 can be increased.

Since the cylinder member 31 has a larger bonding area with the second reinforcing layer 34 than the dome members 32, 33, the adhesion force between the first reinforcing layer 30 and the second reinforcing layer 34 can be increased by forming the surface layer 31B on the cylinder member 31.

The fiber bundle F3 is a bundle of a plurality of continuous fibers f3 impregnated with the second thermosetting resin, and the continuous fibers f3 can be fibers similar to the reinforced fibers mentioned above as examples of the continuous fibers f1.

The second thermosetting resin with which the fiber bundle F3 is impregnated contains a main agent and a curing agent. The main agent includes a resin precursor. Examples of the main agent of the second thermosetting resin include resin precursors similar to those mentioned above as examples of the main agent R of the first thermosetting resin. An epoxy resin precursor is preferable in terms of mechanical strength etc.

The curing agent is not particularly limited as long as it can chemically bond molecules of the resin precursor of the second thermosetting resin together. A more preferable curing agent is a curing agent that can not only chemically bond molecules of the resin precursor of the second thermosetting resin together but also chemically bond the resin precursor of the second thermosetting resin and the resin precursor of the first thermosetting resin. The resin precursor of the first thermosetting resin and the resin precursor of the second thermosetting resin are therefore preferably of the same kind. For example, when these resin precursors are epoxy resin precursors, examples of the curing agent include aliphatic amines, aromatic amines, and polyamide resins.

2-5. Liner Forming Step S5

Figure 11:
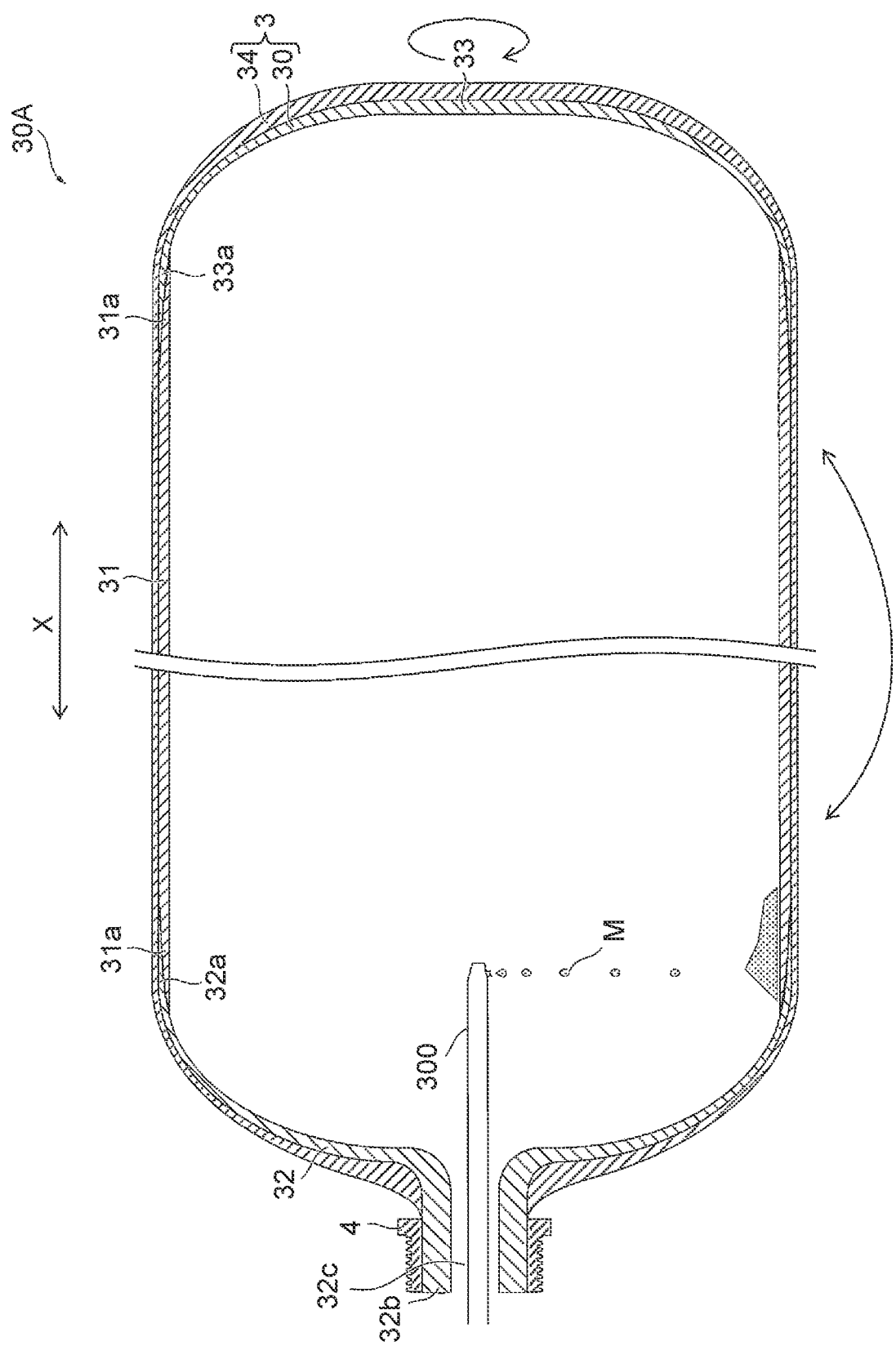
FIG. 11 is a sectional view illustrating a liner forming step shown in FIG. 2.

Next, the liner forming step S5 is performed as shown in FIG. 2. In this step, as shown in FIGS. 11 and 1, the liner 2 is formed in the joined member 30A with the second reinforcing layer 34 formed thereon. The liner 2 is formed so as to cover the inner surface of the joined member 30A.

The liner 2 is formed by coating the inner surface of the joined member 30A with a resin material M. The coating method is not particularly limited as long as the liner 2 can be formed. For example, as shown in FIG. 11, a nozzle 300 is inserted through the through hole 32c that allows the internal and external spaces of the joined member 30A to communicate with each other, and the liquid or softened resin material M is discharged from the nozzle 300 into the internal space of the joined member 30A. The nozzle 300 is then removed through the through hole 32c.

Thereafter, the internal space is heated to a predetermined temperature or higher as necessary. With the resin material M being in a fluid state, the joined member 30A is rotated in the circumferential direction and both ends of the joined member 30A are alternately moved up and down (see FIG. 11). As a result, the resin material M in a fluid state is moved up by the rotation of the joined member 30A, and a part of the resin material M flows down the inner surface of the joined member 30A due to its own weight. The resin material M is thus in contact with and covers the entire inner surface of the joined member 30A.

When the resin material M is a thermosetting resin, the internal space is heated to cure the resin material M. The liner 2 is formed in this manner. When the resin material M is a thermoplastic resin, the internal space is cooled to solidify the resin material M in contact with and covering the inner surface of the joined member 30A. The liner 2 is formed in this manner. In this example, the liner 2 is formed by reaction injection molding using as the resin material M two or more kinds of low molecular weight and low viscosity liquid materials that are fluid at room temperature. In this case, the internal space is heated to produce a polymer from a monomer, and the internal space is then cooled to solidify the polymer. The liner 2 is formed in this manner.

The resin material M is preferably a resin with satisfactory gas barrier properties. Examples of such a resin include thermoplastic resins such as polypropylene resins, nylon resins (e.g., nylon 6 resin or nylon 6,6 resin), polycarbonate resins, acrylic resins, acrylonitrile butadiene styrene (ABS) resins, polyamide resins, polyethylene resins, ethylene-vinyl alcohol copolymer resins (EVOHs), and polyester resins.

After the liner 2 is formed in this manner, the valve 6 is attached to the boss 4. The high-pressure tank 1 shown in FIG. 1 is thus completed. In the present embodiment, the liner 2 is formed after the joined member 30A is formed. However, the liner 2 (resin layer corresponding to the liner 2) may be formed in the cylinder member 31 and the dome members 32, 33 before the joined member 30A is formed.

3. Check Test

The inventors conducted a test for checking formation of the surface layer 31B by preparing a test piece corresponding to the cylinder member 31 according to the method for preparing the cylinder member 31 described in the cylinder member preparing step S1.

Specifically, a cylindrical winding body with a fiber volume fraction Vf of 67% (resin weight content RC of 24 mass %) was prepared by winding continuous fibers impregnated with the first thermosetting resin around a cylindrical mandrel by the FW process. A thermosetting resin containing a main agent, a solid curing agent, and a curing accelerator was used as the first thermosetting resin. Specifically, bisphenol A resin and 1,4-butanediol diglycidyl ether were used as the main agent, DICY with a particle size D50 of 20 µm was used as the solid curing agent, and imidazole was used as the curing accelerator. Carbon fibers with a fiber diameter of 5 to 7 µm were used as the continuous fibers.

Next, the first thermosetting resin in the cylindrical winding body was thermally cured. A test piece as a reference example was thus prepared. By visual observation of the test piece thus prepared, a surface layer softer than the remaining part of the test piece was observed on the surface of the test piece.

Reference Embodiment

A reference embodiment will be described with reference to FIGS. 12 to 14. In the above embodiment, the surface layer 31B is formed on the surface of the cylinder member 31 by using the solid curing agent C. In the reference embodiment, however, the surface layer 31B is formed on the surface of the cylinder member 31 by adjusting the amount of heat that is applied during thermal heating of the cylindrical winding body 31A. The following description will focus on the differences. The same members and portions as those in the above embodiment are denoted by the same signs, and detailed description thereof will be omitted.

In the reference embodiment, a thermosetting resin containing a main agent R and a curing agent is used as the first thermosetting resin. The curing agent may be either a solid curing agent or a liquid curing agent such as aromatic amine as long as it chemically bonds molecules of the resin precursor that are included in the main agent R together.

In the reference embodiment, when thermally curing the first thermosetting resin in the winding body 31A, the amount of heat is set by using the amount of main agent R that will remain without being consumed (the residual amount of main agent R) as an index. Determination of the residual amount of main agent R will be described for the case where the main agent R is an epoxy resin precursor (e.g., bisphenol A resin and 1,4-butanediol diglycidyl ether).

First, the degree of curing of epoxy resin for achieving desired resin strength is determined. The desired resin strength is, for example, the resin strength required for the reinforcing portion 3 as a design condition for the high-pressure tank 1. Since the degree of curing can be evaluated as a glass transition temperature (Tg), the glass transition temperature that provides the desired resin strength is determined from a graph shown in FIG. 12. The graph of FIG. 12 illustrates an example of the relationship between the glass transition temperature of epoxy resin and the resin strength.

Figure 12:
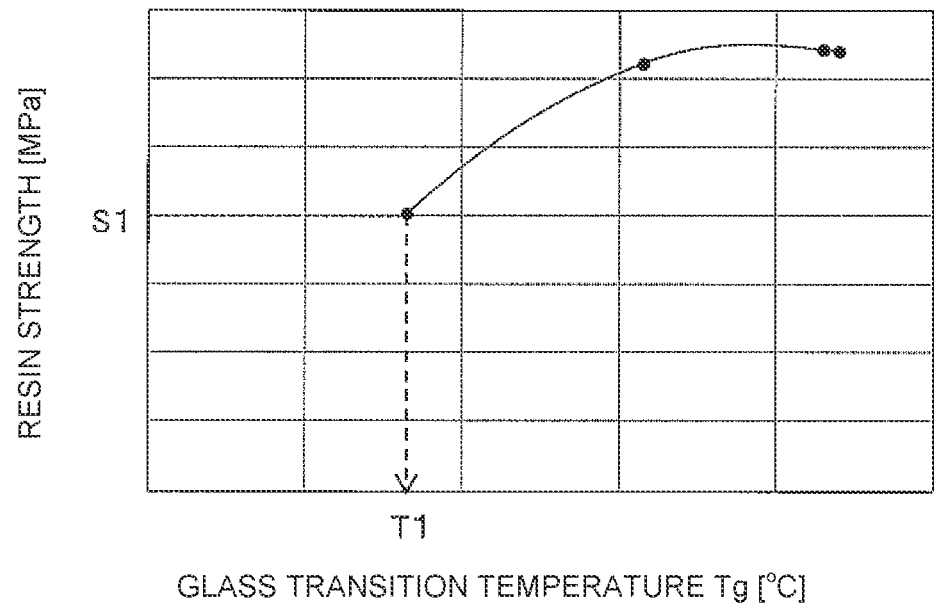
FIG. 12 is a graph illustrating an example of the relationship between the glass transition temperature of epoxy resin and the resin strength according to a reference embodiment.
Figure 13:
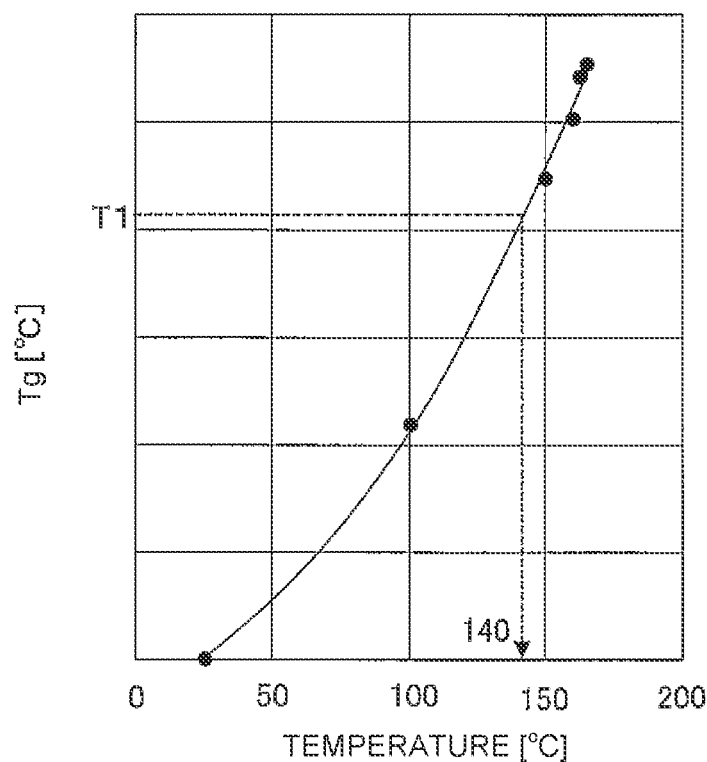
FIG. 13 is a graph showing an example of the measurement results of the glass transition temperature during thermal curing for a test piece according to the reference embodiment.

For example, the graph of FIG. 12 shows that, when the desired resin strength is S1 MPa or higher, the glass transition temperature Tg of the epoxy resin needs to be T1° C. or higher.

The curing time for Tg to reach T1° C. is then determined. Specifically, a test piece corresponding to the winding body 31A is prepared, and the first thermosetting resin in the test piece is thermally cured. The glass transition temperature Tg of the first thermosetting resin is measured after a predetermined curing time. The glass transition temperature Tg can be measured by, for example, differential scanning calorimetry. FIG. 13 shows an example of the measurement results. The graph of FIG. 13 shows that the curing temperature needs to be raised to 140° C. in order for Tg to reach T1° C. That is, it can be said that the amount of epoxy groups consumed before the curing temperature rises to 140° C. is the minimum amount required to achieve the desired resin strength of S1 MPa or higher.

Figure 14:
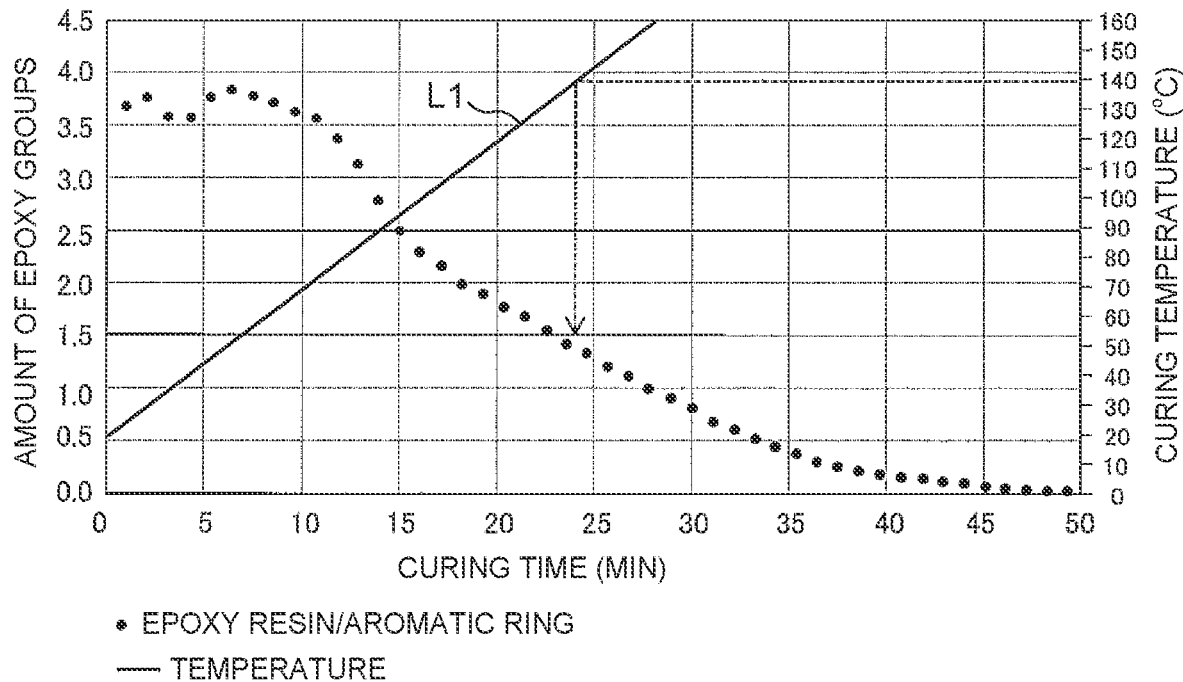
FIG. 14 is a graph showing the relationship between the curing temperature and the amount of epoxy groups with the curing time during thermal curing of the test piece according to the reference embodiment.

FIG. 14 is a graph showing the relationship between the curing temperature and the amount of epoxy groups with the curing time during thermal curing of the above test piece. Continuous line L1 shows the temperature history during thermal curing, and black dots show the amount of epoxy groups. The amount of epoxy groups shown in FIG. 14 is obtained as follows. When the curing agent is an aromatic amine, an aromatic ring peak and an epoxy resin peak are estimated in the measured absorption spectrum. The amount of epoxy groups shown in FIG. 14 is the ratio of the absorbance at the estimated epoxy resin peak to the absorbance at the estimated aromatic ring peak. The absorption spectrum may be measured by, for example, Raman spectroscopy.

As can be seen from FIG. 14, the amount of epoxy groups decreases as the curing time passes. The amount of epoxy groups decreases by about 62.5% (=(4.0−1.5)/4.0)×100) from the amount before the thermal curing before the curing temperature rises to 140° C. That is, it can be said that the amount of epoxy groups consumed before the curing temperature rises to 140° C. is about 62.5%, and as described above, this amount is the minimum amount required to achieve the desired resin strength of S1 MPa or higher.

Accordingly, about 62.5% of the amount of epoxy groups before the thermal curing can be determined to be the minimum value of the residual amount of epoxy groups in the main agent R. Based on the graph of FIG. 14, the curing temperature for leaving about 62.5% or more of the amount of epoxy groups is about 90° C. or lower. Therefore, in order to leave, for example, 62.5% of the amount of epoxy groups during thermal curing of the first thermosetting resin in the winding body 31A, the thermal curing is stopped when the curing temperature (e.g., the temperature of the surface layer 31B) rises to about 90° C.

The amount of heat can thus be determined using the residual amount of main agent R as an index, and the surface layer 31B can be formed on the outer surface of the cylinder member 31 by performing thermal curing with the determined amount of heat (e.g., the conditions of the curing temperature and the curing time). The desired resin strength can be achieved as the residual main agent R is crosslinked or polymerized by the curing agent etc. during thermal curing of the second thermosetting resin.

Although the embodiment of the present disclosure is described in detail above, the disclosure is not limited to the embodiment described above, and various design changes can be made without departing from the spirit of the disclosure described in the claims.

What is claimed is:

1. A method for manufacturing a high-pressure tank, the high-pressure tank including a first reinforcing layer made of a fiber reinforced resin and a second reinforcing layer made of a fiber reinforced resin and covering the first reinforcing layer, the method comprising:

preparing a cylinder member by forming a cylindrical winding body by winding a continuous fiber impregnated with a first thermosetting resin in a circumferential direction, and thermally curing the first thermosetting resin in the winding body;

preparing a joined member corresponding to the first reinforcing layer by joining a pair of dome members to both end portions of the cylinder member; and forming the second reinforcing layer by helically winding a fiber bundle impregnated with a second thermosetting resin around the joined member over the dome members and thermally curing the second thermosetting resin in the wound fiber bundle, wherein a thermosetting resin containing a main agent and a granular solid curing agent is used as the first thermosetting resin, the main agent including a resin precursor of the first thermosetting resin and the solid curing agent chemically bonding molecules of the resin precursor together, wherein a particle size of the solid curing agent is larger than a gap between the continuous fibers, wherein a surface layer having a lower ratio of the solid curing agent to the main agent than a portion other than a surface of the winding body is formed by causing the main agent to ooze from between the continuous fibers onto the surface of the winding body by heating the first thermosetting resin, and wherein the particle size of the solid curing agent is at least 20 µm.

2. The method according to claim 1, wherein the second thermosetting resin contains a main agent and a granular solid curing agent, the main agent including a resin precursor of the second thermosetting resin and the solid curing agent chemically bonding molecules of the resin precursor of the second thermosetting resin together.

3. The method according to claim 2, wherein the main agent in the surface layer reacts by the solid curing agent in the second thermosetting resin.

4. The method according to claim 3, wherein the solid curing agent in the second thermosetting resin chemically bonds the resin precursor of the second thermosetting resin and the resin precursor of the first thermosetting resin together.

* * * * *